US011954187B2

(12) United States Patent
Edwards et al.

(10) Patent No.: US 11,954,187 B2
(45) Date of Patent: Apr. 9, 2024

(54) DETECTING SEPARATE LOGIN DURING ACTION BASED KNOWLEDGE-BASED AUTHENTICATION AND DISQUALIFYING VALIDITY

(71) Applicant: Capital One Services, LLC, McLean, VA (US)

(72) Inventors: Joshua Edwards, Philadelphia, PA (US); Samuel Rapowitz, Roswell, GA (US); Jenny Melendez, Falls Church, VA (US); David Septimus, New York, NY (US); Daniel Miller, Astoria, NY (US); Viraj Chaudhary, Katy, TX (US); Tyler Maiman, Melville, NY (US); Vyjayanthi Vadrevu, Chicago, IL (US)

(73) Assignee: Capital One Services, LLC, McLean, VA (US)

( * ) Notice: Subject to any disclaimer, the term of this patent is extended or adjusted under 35 U.S.C. 154(b) by 413 days.

(21) Appl. No.: 17/355,371

(22) Filed: Jun. 23, 2021

(65) Prior Publication Data

US 2022/0414190 A1    Dec. 29, 2022

(51) Int. Cl.
*G06F 21/00*    (2013.01)
*G06F 21/31*    (2013.01)
*G06Q 40/02*    (2023.01)

(52) U.S. Cl.
CPC ............ *G06F 21/31* (2013.01); *G06Q 40/02* (2013.01); *G06F 2221/2133* (2013.01); *G06F 2221/2135* (2013.01)

(58) Field of Classification Search
CPC ............ G06F 21/31; G06F 2221/2133; G06F 2221/2135; G06Q 40/02; G06Q 20/388; G06Q 20/40; G06Q 20/4014
See application file for complete search history.

(56) References Cited

U.S. PATENT DOCUMENTS

| 8,745,698 | B1 * | 6/2014 | Ashfield | H04L 63/08 |
| | | | | 726/4 |
| 2005/0216768 | A1 * | 9/2005 | Eppert | G06Q 20/40 |
| | | | | 726/5 |
| 2008/0162338 | A1 * | 7/2008 | Samuels | G06F 21/40 |
| | | | | 705/42 |
| 2016/0057143 | A1 * | 2/2016 | Carlson | H04L 63/20 |
| | | | | 726/26 |
| 2020/0175584 | A1 * | 6/2020 | Agrawal | G06Q 40/02 |

* cited by examiner

*Primary Examiner* — Michael M Lee
(74) *Attorney, Agent, or Firm* — Banner & Witcoff, Ltd.

(57) ABSTRACT

Aspects described herein may relate to techniques for detecting login activity to a financial account during a knowledge-based authentication process. The login activity may be related to access to an online interface for the financial account. The detection of login activity during the authentication process my indicate that the integrity of the authentication process is compromised as login access may provide an individual with transaction data that may be used to answer transaction-based authentication questions. As a result of detecting login activity, an alternative authentication process may be initiated or an authentication request related to the financial account may be denied.

20 Claims, 4 Drawing Sheets

DETECTING SEPARATE LOGIN DURING ACTION BASED KNOWLEDGE-BASED AUTHENTICATION AND DISQUALIFYING VALIDITY

FIELD OF USE

Aspects of the disclosure relate generally to authenticating a user. More specifically, aspects of the disclosure provide techniques for modifying a knowledge-based authentication (KBA) process based on the detection of login activity.

BACKGROUND

Financial accounts may be maintained by a financial institution. A user may be required to be authenticated in order to grant a request from the user to access sensitive information or to perform a financial transaction associated with the financial account. Conventional systems for authenticating the user may generate transaction-based questions using any data from transactions conducted using the financial account. These conventional systems may grant the request from the user if the user provides a correct answer to a transaction-based question posed to the user. These conventional systems, however, fail to determine whether the user gains access to the transaction data of the financial account, for example, through an online interface of the financial account, in order to answer the transaction-based question. In doing so, these conventional systems may be circumvented by a user that logs on during the authentication process to answer the transaction-based question not from memory, but from a review of readily available transaction data. As a result, a malicious actor may be mistakenly granted access to the financial account, thereby frustrating the purpose of the authentication process and rendering the financial account vulnerable to fraudulent activity.

Aspects described herein may address these and other problems, and generally enable a user to be verified in a more reliable and robust manner, thereby improving the integrity of the authentication process.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may provide techniques for detecting login activity to a financial account during a knowledge-based authentication process. The login activity may be related to access to an online interface for the financial account. The detection of login activity during the authentication process may cause the knowledge-based authentication process to be modified. For example, a user may request an action be performed in relation to a financial account of the user. The request may trigger authentication of the user. Transactional data associated with the financial account may be provided. A transaction-based question may be generated and provided to the user. The user may provide an answer to the transaction-based question. Login activity to the financial account may be monitored during this process, so that it may be determined if the user gained access to the financial account prior to answering the question. If so, the request from the user may be denied or an alternative authentication process may be initiated. In doing so, a malicious actor seeking access to the financial account may be more reliably detected and fraudulent actions taken with respect to the financial account may be prevented.

For example, some aspects described herein may provide a computer-implemented method for determining if the integrity of a transaction-based authentication process has been compromised based on the detection of login activity related to a financial account subject to authentication. Corresponding apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
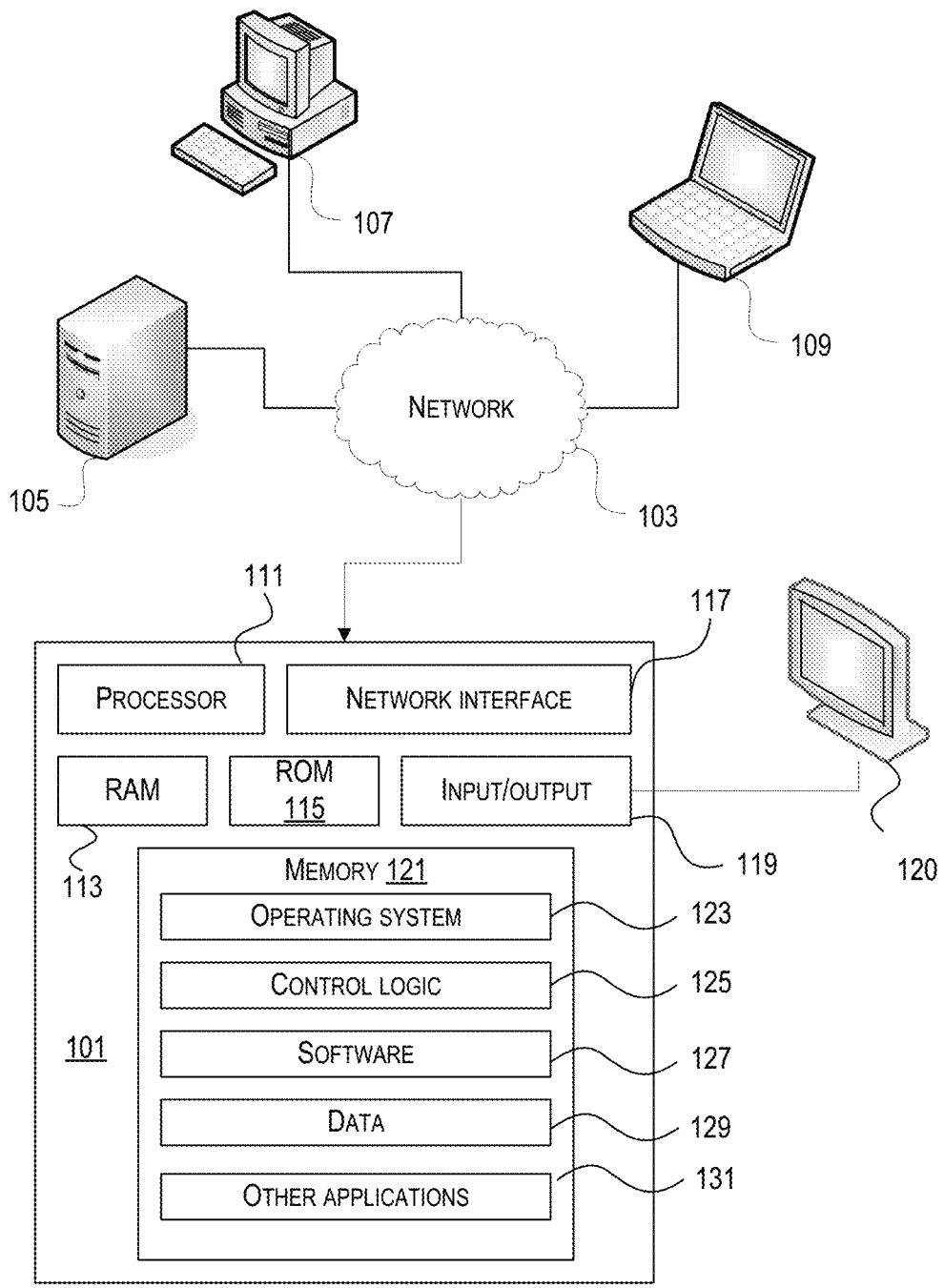
FIG. 1 depicts an example of a computing device that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for authenticating a user. A user may be authenticated using transaction-based authentication questions (e.g., knowledge-based authentication (KBA)). The transaction-based authentication questions may be generated and presented to the user. The transaction-based authentication questions may relate to transactions conducted using a financial account. During the authentication process, login activity to the financial account may be monitored. If login activity (e.g., new login activity) associated with the financial account is detected after presentation of a transaction-based authentication question to the user, then the integrity of the authentication process may be determined to be compromised, as the login activity may indicate that an individual is attempting to circumvent the authentication process by looking up or researching an answer to the presented transaction-based authentication question. Authentication of the user may be denied or, alternatively, another process for authenticating the user may be initiated.

The login activity may be any type of login activity including login activity using an alternative set of credentials. For example, a financial account may have an owner (e.g., a first user) and an authorized user (e.g., a second user). During the authentication process, login activity from any user and based on any set of credentials may be monitored. As an example, the owner of a financial account may be logged into the financial account and may request an action be performed that causes a transaction-based authentication process to be initiated. During such process, login activity based on the second user may be monitored and may be used as an indication that the transaction-based authentication process is compromised. Additionally, login activity to other accounts may also be monitored, including to accounts other than the financial account subject to the authentication process. For example, other accounts—such a financial planning tools—may have access to transaction data maintained by the financial account (e.g., by way of an application programming interface). Login activity to these other accounts may also be monitored as access to these other accounts may indicate that the authentication process is compromised if an individual can use access to another account to answer transaction-based questions relating to the financial account at issue.

Aspects described herein improve the functioning of computers by improving the way in which computing devices authenticate a user. Conventional computing devices implementing conventional techniques for authenticating a user may not consider login activity to a financial account associated with authentication of the user. A user that is able to login to a financial account during the authentication process may be able to answer transaction-based authentication questions by simply looking up answers based on data available through the login access to the financial account. As a result, the integrity of the authentication process may be compromised, rendering the authentication process ineffective (e.g., as an indicator of the user's knowledge of transaction information). As a further result, a malicious actor may be authorized by mistake, making the financial account vulnerable to fraudulent activity. Significant time and energy must then be expended to deal with the fallout of fraudulent activity related to the financial account. By providing improved authorization techniques—for example, based on monitoring login activity and ensuring that presented authentication questions have not been compromised by access to data related to the financial account prior to providing an answer to the authentication questions—authorization may be conducted more accurately and efficiently with lower risk that a malicious actor is mistakenly granted authorization. Over time, the processes described herein may save processing time, network bandwidth, and other computing resources. Moreover, such improvement cannot be performed by a human being with the level of accuracy obtainable by computer-implemented techniques to ensure accurate authentication of a user and improved detection of a malicious actor.

Before discussing these concepts in greater detail, however, several examples of a computing device that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, computing device 101 may implement one or more aspects of the disclosure by reading and/or executing instructions and performing one or more actions based on the instructions. The computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may operate in a standalone environment. In others, computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, local area networks (LANs), wireless networks, personal networks (PAN), and the like. Network 103 is for illustration purposes and may be replaced with fewer or additional computer networks. A LAN may have one or more of any known LAN topologies and may use one or more of a variety of different protocols, such as Ethernet. Devices 101, 105, 107, 109 and other devices (not shown) may be connected to one or more of the networks via twisted pair wires, coaxial cable, fiber optics, radio waves, or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, software 127, data 129, and other applications 131. Control logic 125 may be incorporated in and may be a part of software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125 and/or software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Having discussed several examples of computing devices which may be used to implement some aspects as discussed further below, discussion will now turn to various examples for detecting login activity to a financial account during an authentication or authorization process related to the financial account.

Figure 2:
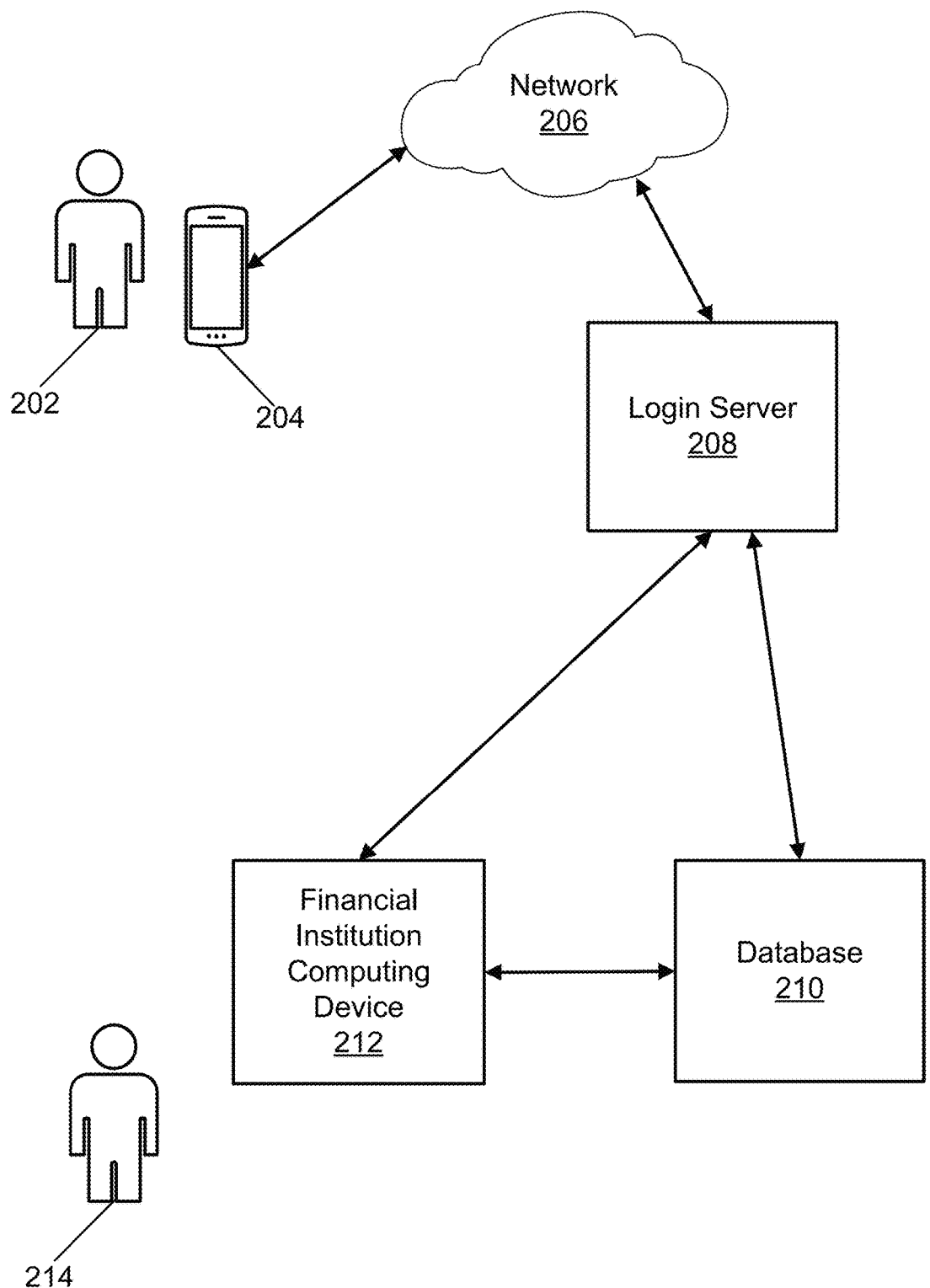
FIG. 2 illustrates an operating environment in which transaction-based authentication questions may be generated for authenticating a user.

FIG. 2 illustrates an operating environment 200 in which a transaction-based authentication process may be implemented. As shown in FIG. 2, the operating environment may include a user 202, a user computing device 204, a network 206, a login server/account server 208 (also referred to herein as login server or login/account server), a database 210, a financial institution computing device 212, and a customer service representative 214.

The user 202 may be any individual or may represent a legal entity. The user computing device 204 may be any type of computing device including any computing device depicted and described in relation to FIG. 1. The user computing device 204 may be, for example, a smartphone, a laptop, or a tablet. The user computing device 204 may be a wireless device such as, for example, a portable wireless computing device.

The user computing device 204 may be associated with the user 202. The user 202 may use the user computing device 204 to access secure or sensitive information associated with a financial account. The user 202 may use the user computing device 204 to request performance of a transaction associated with a financial account. The user 202 may be or might not be authorized to access sensitive information associated with a financial account. The user 202 may be or might not be authorized to issue a request to conduct a transaction associated with the financial account. For example, the user 202 may be or might not be the true-named-person of the financial account (e.g., the user 202 may or might not be an owner, an authorized user, or an account holder of the financial account subject to a request). For example, the user 202 may be a malicious actor intending to gain unauthorized access to a financial account.

The network 206 may communicatively couple the user computing device 204 with the login server 208. The network 206 may be any type of communications and/or computer network. The network 206 may include any type of communication mediums and/or may be based on any type of communication standards or protocols. The network 206 may be the same or similar to the network 103 of FIG. 1. The network 206 enables data or other information to be shared between the user computing device 204 and the login server 208, the database 210, and/or the financial institution computing device 212.

The login server 208 may be any type of computing device including any computing device depicted and described in relation to FIG. 1. The login server 208 may be associated with a financial institution. For example, the login server 208 might be a server associated with a particular financial institution. The login server 208 may represent one or more computing devices and/or a computer network associated with the financial institution. The login server 208 may include one or more computers, servers, and/or databases. The financial institution may be a bank, credit union, credit card company, or any other type of financial institution that may provide one or more financial accounts to an individual or legal entity.

As another example, the login server 208 may be a login server for another account that may be provided with access to transactional data maintained for a financial account. For example, the login server 208 may be a login server to a service or product such as a financial planning tool (e.g., from a third-party provider) that is able to access and/or store financial transaction data for the financial account subject to authentication. According to the techniques described herein, monitoring of login activity may include monitoring of login activity to one of these other accounts.

The database 210 may be any type of computing device including any computing device depicted and described in relation to FIG. 1. The database 210 may also be associated with the financial institution. The database 210 may represent one or more computing devices and/or data storage devices associated with the financial institution. The database 210 may include one or more computers, servers, and/or databases.

The financial institution computing device 212 may be any type of computing device including any computing device depicted and described in relation to FIG. 1. The financial institution computing device 212 may also be associated with a financial institution. For example, the financial institution computing device 212 might be a server associated with a particular financial institution. The financial institution computing device 212 may represent one or more computing devices and/or a computer network associated with the financial institution. The financial institution computing device 212 may include one or more computers, servers, and/or databases.

The user 202 associated with the user computing device 204 may have one or more financial accounts with the financial institution associated with the financial institution computing device 212. The user 202 may have a checking account, a savings account, a line of credit, and/or a credit card account provided through the financial institution associated with the financial institution computing device 212. In general, the user 202 associated with the user computing device 204 may have any type of financial account with the financial institution associated with the financial institution computing device 212.

Alternatively, the user 202 may be a malicious actor that seeks access or use of a financial account maintained by the financial institution computing device 212. That is, the user 202 may not be an authorized user of a financial account maintained by the financial institution computing device 212 and may seek to access or use the financial account without authorization or in any other nefarious manner.

The financial institution computing device 212 may store information related to various financial accounts maintained by the financial institution associated with the financial institution computing device 212. For example, the financial institution computing device 212 may store data or other information related to various transactions for each financial account maintained by the financial institution. The financial institution computing device 212 may store information related to various financial accounts associated with the user 202 (e.g., data or other information related to various transactions for each financial account associated with the user 202). The information may be stored in the database 210. Further, the transactional data may include any type of transactional data related to a transaction such as, for example, a date, a time, an amount charged, an amount credited (e.g., an amount refunded), and a merchant name for a transaction. The transactional data may also include stock-keeping unit (SKU) data that may include or may be used to determine an item or service related to a particular transaction (e.g., an item or product purchased during a particular transaction).

The financial institution computing device 212 may also maintain information that may be accessible to individuals that may have an account provided by the financial institution. Individuals may gain access to information related to a particular account through a login access to the account (e.g., through online access). For example, the user 202 may gain access to a financial account maintained by the financial institution by logging in to the financial account through the login server 208. The login server 208 may require the user 202 to provide credentials to gain access to the financial account. The login server 208 may interface with the user 202 to allow the user 202 to provide required credentials to gain access to a particular account. The login server 208 may be capable of tracking when a login request to a particular account is requested (e.g., a time of a login request and/or a time of when access to the account is provided) and may be capable of determining an indicator of a device (e.g., the user computing device 204) used to gain access (e.g., an IP or MAC address of the device may be determined).

In general, the login server 208, the database 210, and the financial institution computing device 212 may operate to provide the user 202 with online access (e.g., electronic-based access) to information related to a financial account. The online access may provide the user with data related to the financial account including, for example, a balance of the financial account and transactional data related to the financial account (e.g., a date, a time, an amount charged, an amount credited or refunded, and a merchant name for a transaction). Once logged into the financial account, the user 202 may be able to access financial data related to the account through a web-based interface, an app-based interface, or through some other electronic means. As another example, the user 202 may able to access financial data related to the account through a call-based (e.g., telephone-based) interface.

The user 202 may use the user computing device 204 to attempt to conduct a financial transaction using (e.g., funded by) the account maintained by the financial institution computing device 212 and/or the user 202 may use the user computing device 204 to attempt to access sensitive or secure information related to the first account maintained by the financial institution computing device 212. Any such attempt by the user 202 may trigger the financial institution computing device 212 to verify or authenticate the user 202 (e.g., to ensure the user 202 is allowed to access the requested information or to have a requested transaction conducted). For example, any such attempt by the user 202 may cause the financial institution computing device 212 to operate to authenticate the identity of the user 202 to ensure the user 202 is indeed the individual associated with the financial account and therefore authorized to perform the requested transaction or to access the requested information.

The financial institution computing device 212 may authenticate the user 202 by generating transaction-based questions (e.g., authentication or authorization questions). The authentication questions may be based on transactional data associated with the financial account with which the user 202 requests an action to be performed (e.g., a request to perform a transaction and/or a request to access secure information). The authentication question may be considered to be knowledge-based questions as they require the user 202 to be familiar with underlying data (e.g., transactional data related to a financial account) to answer the questions correctly. Accordingly, the authentication process may be considered to be a knowledge-based authentication (KBA) process.

As an example, the user 202 may request an action be performed relating to the financial account associated with the user 202. In response, the financial institution computing device 212 may receive a request for authorization to perform the action relating to the financial account associated with the user 202. The financial institution computing device 212 may generate one or more authentication questions based on the transaction data associated with the financial account associated with the user 202.

The one or more authentication questions may be directed to any aspect of any transaction conducted using the financial account associated with the user 202. The financial institution computing device 212 may generate the one or more authentication questions based on the transactional data stored in the database 210. As an example, an authentication question may relate to a merchant with which the user 202 has conducted a transaction using the financial account associated with the user 202. The authentication question may ask the user 202 to indicate whether or not the user 202 conducted a transaction with a particular merchant within a particular period of time (e.g., a predetermined period of time prior to the user 202 requesting an action be performed relating to the financial account associated with the user 202).

The authentication question may also include or indicate an amount of a transaction or an item or service that may have been purchased. The authentication question may be posed as any type of question including, for example, a true/false (T/F) question, a multiple-choice question, or a yes/no (Y/N) question. The authentication question may be posed in a manner that requests the user 202 to provide an answer either verbally and/or by entering an answer electronically using the user computing device 204 (e.g., via a keypad or touchscreen). The financial institution computing device 212 may also generate a correct or expected answer to the authentication question.

The authentication question may provide one or more correct answers to the user 202 and/or one or more incorrect or false answers to the user 202. The financial institution computing device 212 may authorize the user 202 (e.g., and/or authorize the request to perform the action relating to the financial account associated with the user 202) based on the response of the user 202.

As an example, the user 202 may be logged into the financial account through a web-based interface. The user 202 may then request a relatively large sum or amount of funds to be transferred to another financial account maintained by another financial institution. The large transfer request may trigger the financial institution computing device 212 to initiate an authentication process of the user 202. The user 202 may have undergone an initial authentication process to gain online access to the account; however, the large transfer request may trigger a more robust and KBA authentication process. The financial institution computing device 212 may then operate in conjunction with the login server 208 and the database 210 to further authenticate the user 202.

A large transfer request (or other request related to the financial account) may trigger the financial institution computing device 212 to initiate an authentication process of the user 202 even if the user 202 is not already logged into the financial account. For example, the user 202 may attempt some requested transaction over the phone, at a merchant, or at a bank. Under any such scenario, transaction-based authentication of the user 202 may be initiated.

Transaction-based authentication of the user 202 may involve the customer service representative 214 (or, alternatively, may involve an interactive voice response (IVR) system). For example, once the transaction-based authentication of the user 202 is initiated, the representative 214 may be involved and may communicate with the user 202 during the authentication process. As a first example, the user 202 may be logged into the financial account and the transaction-based authentication process may be initiated. At such time, the user 202 may be required to interface with the representative 214 to undergo authentication. The user 202 may be required to call the representative 214 or the representative 214 may call the user to establish verbal communication with the user 202. As a second example, the user 202 may be required to interface with the representative 214 to undergo authentication when not already logged into the financial account. Again, under any scenario, communications between the user 202 and the representative 214 may be established to perform the authentication process.

Alternatively, the authentication process may be performed without verbal communications being established between the user 202 and the representative 214. That is, the user 202 may be authenticated through an electronic-based process involving the login server 208, the database 210, and the financial institution computing device 212. In the detailed example provided below, the representative 214 is described as involved in the process but it is to be understood that such process may be modified to not include the representative 214. For example, the user 202 may be required to use an app to undergo authentication. The app may be an app the user 202 may use to access the financial account. Under such scenario, during authentication, the user 202 may undergo a step-up authentication process where a new window or display is provided to the user 202 that may prevent the user for accessing transaction data of the financial account during the authentication process—so that the user 202 may not access transaction data when receiving and answering an authentication question on the device (e.g., the user computing device 204) the user 202 may be using to undergo authentication.

Under various scenarios, the user 202 may receive a telephone call from the representative 214 when an authentication process is initiated (and/or may receive a call from an IVR system). The user 202 and the representative 214 may be able to communicate verbally during authentication. During the authentication process, the financial institution computing device 212 may provide an authentication user interface (UI) to the representative 214. The authentication UI may indicate to the representative 214 that the user 202 is to undergo authentication.

The financial institution computing device 212 may also include an authentication question and answer generation component (e.g., an application programming interface (API)) for generating authentication questions and corresponding correct and incorrect answers for presentation to the user 202. The financial institution computing device 212 may interact with the database 210 to access financial data of the financial account stored in the database to generate the authentication questions and answers. Authentication questions and answers may be presented to the representative 214 via the UI provided by the financial institution computing device 212.

The financial institution computing device 212 may also include a response (e.g., question answer) verification component (e.g., an API) for verifying the accuracy of the responses by the user 202 to any presented authentication question. For example, the response verification component may determine if a response to an authentication question matches a correct answer to the authentication question as generated by the authentication question and answer generation component of the financial institution computing device 212. Based on the accuracy of the response provided by the user 202, the UI provided by the financial institution computing device 212 may indicate to the representative whether the user 202 answered correctly or incorrectly.

To authenticate the user 202, the representative 214 may be provided with an authentication question to present to the user 202. For example, the representative 214 may be provided with an authentication question and may read the question aloud to the user 202. As an example, the authentication question may be provided to the representative through a UI (e.g., graphically displayed on a web page interface). Alternatively, the authentication question may be presented on a display to the user 202 (e.g., on the user computing device 204) and the user 202 may be asked to provide an audible answer. The financial institution computing device 212 may generate a timestamp at a time the authentication question is generated, at a time the authentication question is provided to the representative 214, or at a time just before the representative 214 reads the authentication question aloud to the user 202. Under various scenarios, the financial institution computing device 212 stores information indicating a time prior to a time the authentication question is provided to the user 202. The information may be stored as a timestamp in the database 210 and may indicate a particular authentication question related to the indicated stored time. In this manner, the authentication process provided by the login server 208, the database 210, and the financial institution computing device 212 may store information indicating a time that is prior to the user 202 receiving a particular authentication question.

The authentication question may then be presented to the user 202. During the authentication process, the login server 208 may monitor login activity related to the financial account associated with the authentication process. The login server 208 may determine if any new login activity related to the account is detected. If login activity is detected—for example, an individual logins into an online access interface associated with the financial account—then the login server 208 may store information indicating a time the login activity was detected. The information may be stored as a login timestamp in the database 210. The login timestamp may include a time indicating when login activity was detected and the associated financial account. The authentication question may be present to the user 202 in a variety of manners including, for example, causing the authentication question to be displayed on a UI of a device associated with the user 202. For example, a web page portal or app interface may be caused to display the authentication question.

The login server 208 may track information related to a device used to login to the financial account during the authentication process. For example, the login server may store information (e.g., as part of the login timestamp) that indicates the device used for login. The device may be the user computing device 204 (e.g., the user 202 may be attempting to login to the financial account) or may be another device separate from a device used by the user 202 to interact with the representative 214.

After presenting the authentication question to the user 202, the user 202 may provide an answer to the authentication question. For example, the user 202 may provide a verbal response as an answer to the authentication question. The financial institution computing device 212, as part of the authentication process, may compare any indications of login activity to any timestamps stored in relation to any presented authentication question. As an example, the financial institution computing device 212 may compare a time indicted by the authentication question timestamp to a time indicated by the login timestamp, if login activity was detected and a login timestamp was stored in the database 210.

If the comparison reveals that the login activity occurred during the authentication process—for example, the login activity may occur after the user 202 receives the authentication question—then, the financial institution computing device 212 may determine that the authentication process is not reliable. That is, the authentication process may be determined to be compromised, as login activity may indicate that someone (e.g., the user 202) may be gaining access to transaction data related to the account in order to answer the authentication question. The login activity may be conducted by the user 202 or another individual and may or may not be for purposes of researching or answering the authentication question by looking up the answer. However, the financial institution computing device 212 may determine that the process is compromised, since the authentication process may no longer be testing the user's unaided knowledge about the financial account, and instead may have been circumvented by someone attempting to cheat the process (e.g., by looking up the answer after receiving the question and providing an answer based on that lookup process).

As a specific example, consider that the financial institution computing device 212 generates an authentication question at time X (e.g., 3:15 pm ET) and provides the authentication question to the representative. At a short time after time X, the representative 214 causes the authentication question to be provided to the user 202. During this time, the login server 208 may be monitoring login activity. At a time Y (e.g., 3:20 pm ET) during the process, the login server 208 may determine that login access to the subject financial account was provided. The financial institution computing device 212 may then compare the two times—time X and Y (e.g., 3:15 pm ET to 3:20 pm ET). If time Y is determined to be after time X, then the financial institution computing device 212 may provide an alert to the representative (e.g., via the UI component of the financial institution computing device 212). The representative 214 may then be directed via the financial institution computing device 212 to either deny the authentication of the user 202 (or the financial request associated with the user 202), or may be directed to authenticate the user 202 in another manner. For example, the representative 214 may be directed to authenticate the user 202 based on other account information not available to the user 202 when logged into the financial account.

Under various scenarios, the financial institution computing device 212 may store an indication of a time an answer to the authentication question is provided by the user. Again, such time indicators may be stored as timestamps in the database 210. The answer timestamp may store an indicator of a time, the answer, and the corresponding question. For example, the user may provide an answer at time Z (e.g., 3:25 pm ET). The financial institution computing device 212 may determine the process has been compromised if the time Y is after time X and before time Z (e.g., 3:20 pm is after 3:15 pm ET but before 3:25 pm ET), and may then proceed as described above (i.e., determine that authentication of the user 202/request should not be based on the response to the authentication question). If the comparison determines that the login occurred after the user 202 provided the answer (e.g., time Y is after time Z), then the financial institution computing device 212 may determine that the process has not been compromised and the answer may be used to determine authentication of the user 202.

By comparing a time of any login activity, associated with the financial account that is associated with the user 202 that is being authenticating (or to any other account that may be provided with or may have access to any financial transaction data of the financial account), to a time an authentication question is presented to the user 202 or generated (and in some instances also to a time an answer to the authentication questions is provided by the user 202), the financial institution computing device 212 can assess the integrity of the authentication process and, moreover, determine if the authentication question provides a reliable route for authenticating the user 202. Without such operation, the authentication process may be circumvented by a malicious actor that may login to the financial account to use available data to answer the authentication question, thereby frustrating the purpose of the authentication question which is to test the knowledge of the user 202 in an unaided manner. Accordingly, the authentication techniques described herein may more accurately authenticate the user 202 and more reliably detect a malicious actor that may be trying to fraudulently access to the financial account.

The time information stored by the financial institution computing device 212 can include any type of information. For example, the timestamp associated with the authentication question (authentication question timestamp) can store any of the following information (or indicators thereof): a time the question was generated; a time the question was provided to the representative 214; a time the question was provided to the user 202 (e.g., verbally or by visually display); an identification of a financial account related to the authentication processor; and the authentication question.

The timestamp associated with the login activity (login activity or login timestamp) can store any of the following information (or indicators thereof): a time the login activity was detected (e.g., time of login request, time login request granted/access to online interface granted); an identification of a financial account related to the authentication processor; and an identification of the device used to request login access to the financial account.

The timestamp associated with the answer to the authentication question (answer timestamp or response timestamp) can store any of the following information (or indicators thereof): a time the answer was provided by the user (e.g., verbally or through a user interface); an identification of a financial account related to the authentication processor; the authentication question to which the answer corresponds; the response to the question.

As mentioned herein, the techniques for authenticating the user 202 can use the authentication question timestamp with or without the answer timestamp to compare to the login timestamp to determine if login access to the financial account was attempted or granted after the authentication was presented to the user 202 or the question generated (and in some instance, if login access to the financial account was attempted or granted before an answer to the authentication question was provided by the user 202).

When the user 202 is already logged into the online interface for the financial account (e.g., via the user computing device 204) and an authentication process is initiated, the financial institution computing device 212 may operate to adjust a display caused to be displayed to the user 202. The adjustment may cause another display to be presented that blocks or prevents the user 202 from viewing any transactional data related to the financial account. In this manner, the authentication process may be conducted while the user 202 is already logged into the online interface of the financial account. Further, the integrity of the authentication process may be maintained by monitoring if any new or separate login activity (e.g., via another or separate device) to the financial account occurs during the process as described herein.

Access to the financial account may be access provided via a web portal or through a mobile app, or through an IVR system. The login activity monitoring described herein may detect when access to the financial account is attempted or provided through such access.

Figure 3:
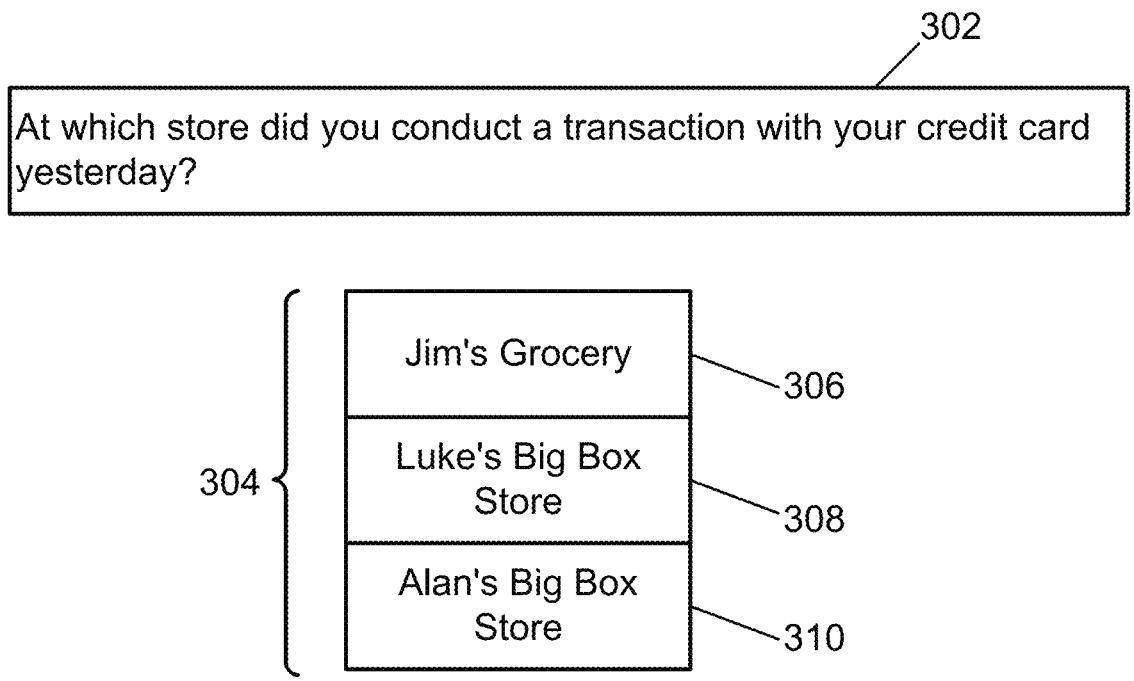
FIG. 3 illustrates an example of an authentication question that may be presented to a user.

FIG. 3 illustrates an example of an authentication question 300 that may be presented to a user (e.g., the user 202). The authentication question 300 may be presented in any manner to the user. The first authentication question 300 may be presented to the user via a display screen (e.g., a display screen of the user computing device 204). The authentication question 300 may be presented to the user audibly (e.g., via a landline phone or via a speaker of the user computing device 204).

The authentication question 300 may include a prompt 302. The authentication question 300 may further include a set of possible answers 304, that includes a first answer choice 306, a second answer choice 308, and a third answer choice 310. As an example, the owner of a financial account may have conducted a transaction at Luke's Big Box Store (represented by the second answer choice 308) on the prior day (yesterday). According to the techniques described herein, the financial institution computing device 212 may monitor if a user (e.g., the user 202) logs into the financial account after the authentication question 300 is presented to the user (and in some instance, before any answer is provided by the user 202).

If a malicious actor is attempting to use the financial account, the malicious actor may login to the financial account after the authentication question 300 is presented. By doing so, the malicious actor may attempt to review available financial transaction data of the financial account to determine the correct answer to the authentication question 300. Conventional authentication systems that do not implement the authentication techniques described herein may mistakenly authenticate the malicious actor when such conventional systems do not determine whether the individual answering the authentication question may have had online access to the financial account when answering the question. By monitoring such access, the techniques described herein significantly reduce the risk of granting access to an individual that is not actually authorized to perform a requested action. Further, either access to the individual may be denied or some other form of authentication may be pursued.

Discussion will now turn to an example method for detecting login activity during an authentication process.

Figure 4:
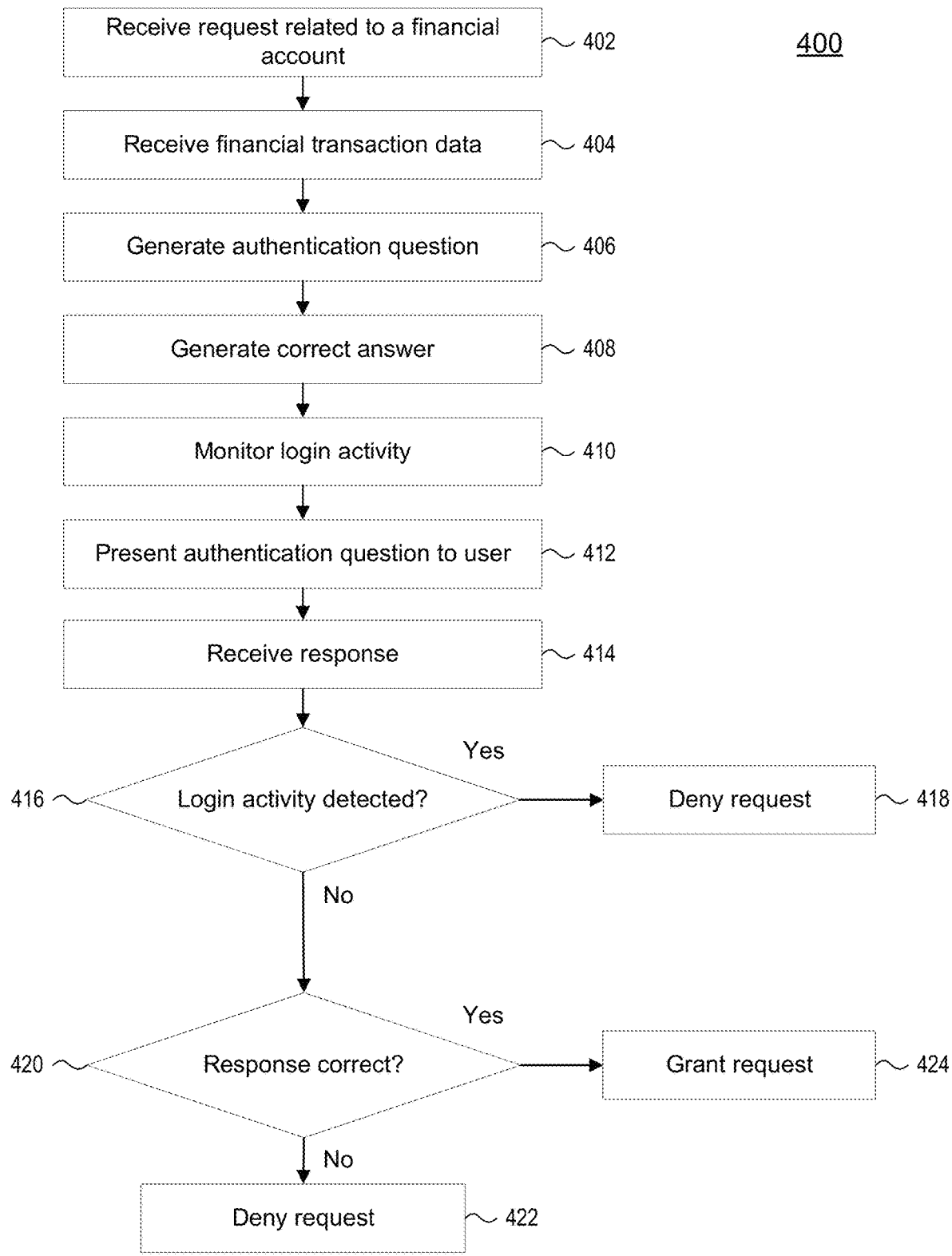
FIG. 4 illustrates an example method for detecting login activity during an authentication process that involves transaction-based questions.

FIG. 4 illustrates an example method 400 for detecting login activity during an authentication process that involves transaction-based questions. Login activity to a financial account may be detected by monitoring an account access log for the financial account. The account access log may store information indicating a time online access to a particular account was requested, granted, and/or denied. A transaction-based question relating to the financial account may be generated and provided to a user that wishes to be authenticated. A timestamp may be associated with providing the question to the user. A timestamp may also be associated with any detected login activity. A comparison between a time of any login activity may be compared to a time the transaction-based question is provided to the user. If the login activity is determined to have occurred after the transaction-based question is provided to the user, then the authentication process may be modified to either deny access to the user or to select an alternative manner to authenticate the user.

Method 400 may be implemented by a suitable computing system and/or any combination of computing systems or devices, as described herein. For example, method 400 may be implemented in any suitable computing environment by a computing device and/or combination of computing devices, such as computing devices 101, 105, 107, and 109 of FIG. 1 and/or by any one or more of the components depicted in any of FIG. 2 such as, for example, the login server 208, the database 210, and/or the financial institution computing device 212, or any combination thereof. Method 400 may be implemented in suitable program instructions, such as in software 127, and may operate on data, such as data 129.

At step 402, a request for authorization to perform an action relating to a financial account may be received. The request may be initiated by a user. The user may be any individual including, for example, an owner, authorized user, or account holder associated with the financial account. Alternatively, the user may not be an authorized user of the financial account and may be a malicious actor.

The action may comprise conducting a financial transaction using the financial account. The action may comprise accessing secure information relating to the financial account. The action may comprise accessing funds of the financial account. The financial account may be any type of account such as, for example, a personal financial account.

At step 404, financial data relating to the financial account may be received. The financial data may be received from one or more databases.

At step 406, an authorization question for determining whether to perform the action relating to the financial account may be generated. The authorization question may be generated based on the financial data. The authorization question may be a transaction-based question relating to the financial account.

At step 408, a correct answer to the authorization question may be generated. The correct answer may be generated based on the financial data and the authorization question.

At step 410, login activity to the financial account may be monitored to determine if login access to the financial account is detected. Login activity may be monitored based on an account access log that identifies whether access to the financial account has been requested, denied, and/or granted. The access may be any type of access including online access to the financial account that provides an individual gaining access the ability to review transaction data related to the financial account. As an example, a financial account access log may be generated based on monitoring any login access to the financial account. A login timestamp may be generated when any login access to the financial account is detected. As a further example, the monitoring may further include determining a device associated with the login access that is detected. The login timestamp may also store information indicating how long access to the financial account was provided (e.g., a duration of the access to the financial account).

At step 412, the authorization question may be presented to the user. The authorization may be presented to the user in any manner. For example, the authorization question may be provided verbally by a customer service representative (e.g., over a telephone connection). The authorization may also be caused to be displayed to the user. The authorization question may be any type of transaction-based question regarding the financial account including, for example, a question whether the user conducted a particular transaction at a particular merchant within a particular time period. The authorization question may also include a set of answer choices with one or more correct answers and/or one or more incorrect answers. The authorization question may prompt the user to answer the authorization question.

At step 414, a response to the authorization question may be received. The response may be received as a verbal response and/or as a response provided though a computing device (e.g., by provided a touch-based input, keyed data entry, or other electronic data entry mechanism).

At step 416, a determination may be made as to whether login activity to the financial account was detected subsequent to generating the authorization question and/or subsequent to providing the authorization question to the user. An authorization question timestamp may be generated at a time the authorization question is generated or at a time the authorization is initially provided to the user. A login timestamp may be generated at a time login activity related to the financial account is detected. An answer timestamp may be generated at a time a response to the authorization question is received from the user.

In a first example, the authorization question timestamp may be compared to the login timestamp. If a time indicated by the login timestamp is later in time compared to a time indicated by the authorization question timestamp, then a determination may be made that login activity to the financial account was detected subsequent to generating the authorization question, and the method may proceed to step 418. In this manner, the method 400 may determine that the user has gained online access to the financial account after receiving the authorization question and may have been able to use information available through such online access to answer the authorization question.

In a second example, the authorization question timestamp may be compared to the login timestamp and to the answer timestamp. If a time indicated by the login timestamp is later in time compared to a time indicated by the authorization question timestamp and if the time indicated by the login timestamp is earlier in time compared to a time indicated by the answer timestamp, then a determination may be made that login activity to the financial account was detected subsequent to generating the authorization question and prior to the user providing answer to the authorization question, and the method may proceed to step 418. In this manner, the method 400 may determine that the user has gained online access to the financial account after receiving the authorization question and may have been able to use information available through such online access to answer the authorization question.

At step 418, the request for authorization to perform the action relating to the financial account may not be granted (e.g., may be denied), based on the determination made at step 416. In a first example, the request may be outright denied and access to the financial account may be outright denied. In a second example, the authorization process may be adjusted or modified to pursue another manner of determining whether to grant or deny the request. That is, the request may not be outright denied and instead an alternative authorization process for determining whether to grant the request for authorization to perform the action relating to the financial account may be initiated. The alternative authorization process may include posing an alternative authorization question to the user that is not transaction-based and/or does not involve questions related to the financial account that a user can answer simply by logging into the financial account.

If step 416 results in a determination that the user did not gain online access to the financial account after the authorization question was generated (or after the authorization question was provided to the user and/or prior to the user gaining online access to the financial account), then the method 400 may proceed to step 420.

At 420, the response may be compared to the correct answer. If the response matches the correct answer, then at step 424, the request for authorization may be granted. If the response does not match the correct answer, then at step 426, the request for authorization might not be granted. In this manner, a determination whether to grant the request for authorization to perform the action relating to the financial account may be based on the response to the authorization question.

Any of the techniques described herein for generating authentication questions may be implemented within a call center environment. For example, the user 202 may use a landline telephone or cellphone to call a call center (or may receive a call from a call center) to effectuate authentication. A call center representative may read an authentication question (including any answer choices) to the user 202 (or an authentication question may be displayed on a device used by the user). The user 202 may answer the authentication questions verbally so that the call center representative may hear the verbal response. The user 202 may then be authenticated or not authenticated based on the verbal response of the user 202.

In the method 400, any detected login activity may be login activity caused by the user or any other individual. The login activity may be caused by a device used by the user or by another device. Under any scenario, any detected login activity after generating and/or providing the authorization question to the user may be considered as compromising the integrity of the transaction-based authentication question (as another individual using another device may be working together with the user in an attempt to circumvent the transaction-based authentication process).

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method comprising:
receiving a request for authorization to perform an action relating to a financial account;
receiving, from one or more databases, financial transaction data relating to the financial account;
generating, based on the financial transaction data, an authorization question for determining whether to perform the action relating to the financial account;
generating, based on the financial transaction data and the authorization question, a correct answer to the authorization question;
providing the authorization question to a user;
receiving a response to the authorization question;
determining, based on comparing a first timestamp associated with the providing the authorization question and a second timestamp associated with a login access to the financial account, whether the login access to the financial account is detected after providing the authorization question to the user; and:
  if the login access to the financial account is detected after providing the authorization question to the user, denying the request for authorization to perform the action relating to the financial account based on the response to the authorization question; or
  if the login access to the financial account is not detected after providing the authorization question to the user, determining whether to grant the request for authorization to perform the action relating to the financial account based on the response to the authorization question.

2. The method of claim 1, wherein generating the authorization question further comprises generating the first timestamp.

3. The method of claim 1, further comprising:
generating a financial account access log based on monitoring login access to the financial account, wherein the financial account access log comprises the second timestamp, and wherein determining whether the login access to the financial account is detected after the providing the authorization question to the user is based on the financial account access log.

4. The method of claim 3, further comprising:
generating the second timestamp.

5. The method of claim 1, further comprising:
generating the first timestamp;
comparing the first timestamp to the second timestamp;
determining that the login access to the financial account is detected after the providing the authorization question to the user based on the comparing the first timestamp to the second timestamp; and
initiating an alternative authorization process for determining whether to grant the request for authorization to perform the action relating to the financial account.

6. The method of claim 1, wherein the determining to not grant the request for authorization to perform the action relating to the financial account based on the response to the authorization question further comprises initiating an alternative authorization process.

7. The method of claim 6, wherein initiating the alternative authorization process further comprises generating an alternative authorization question for determining whether to perform the action relating to the financial account.

8. The method of claim 1, wherein determining to not grant the request for authorization to perform the action relating to the financial account based on the response to the authorization question further comprises denying the request for authorization.

9. The method of claim 1, wherein determining whether to grant the request for authorization further comprises comparing the response to the authorization question to the correct answer to the authorization question.

10. The method of claim 9, further comprising granting the request for authorization based on the response to the authorization question matching the correct answer to the authorization question.

11. The method of claim 9, further comprising denying the request for authorization based on the response to the authorization question not matching the correct answer to the authorization question.

12. The method of claim 1, wherein the action comprises accessing funds of the financial account.

13. The method of claim 1, further comprising:
generating an answer timestamp, the answer timestamp indicating a time that the response to the authorization question was received;
comparing the second timestamp to the first timestamp and to the answer timestamp;
determining, based on the comparing the second timestamp to the first timestamp and to the answer timestamp, that the login access to the financial account is detected after the generating the authorization question and before the receiving the response to the authorization question; and
initiating an alternative authorization process for determining whether to grant the request for authorization to perform the action relating to the financial account.

14. The method of claim 1, further comprising
determining a device associated with the login access to the financial account.

15. A computer-implemented method comprising:
receiving a request for authorization to perform an action relating to a financial account;
receiving, from one or more databases, financial transaction data relating to the financial account;
generating, based on the financial transaction data, an authorization question for determining whether to perform the action relating to the financial account;
generating, based on the financial transaction data and the authorization question, a correct answer to the authorization question;
providing the authorization question to a user;
determining, based on comparing a first timestamp associated with the providing the authorization question to the user and a second timestamp associated with a login access to the financial account, the login access to the financial account is detected after the providing the authorization question to the user;
receiving a response to the authorization question; and
denying, based on the determining the login access to the financial account is detected after the providing the authorization question to the user, the request for authorization to perform the action relating to the financial account based on the response to the authorization question.

16. The computer-implemented method of claim 15, further comprising:
initiating an alternative authorization process, wherein the alternative authorization process comprises generating an alternative authorization question for determining whether to perform the action relating to the financial account.

17. The computer-implemented method of claim 15, further comprising:
generating the first timestamp.

18. The computer-implemented method of claim 17, further comprising:
generating the second timestamp.

19. The computer-implemented method of claim 15, wherein determining the login access to the financial account is detected after the providing the authorization question to the user further comprises determining whether a difference between the first timestamp and the second timestamp satisfies a threshold.

20. One or more non-transitory computer-readable media storing instructions that, when executed by one or more processors, cause the one or more processors to perform steps comprising:
receive a request for authorization to perform an action relating to a financial account;
receive, from one or more databases, financial transaction data relating to the financial account;
generate, based on the financial transaction data, an authorization question for determining whether to perform the action relating to the financial account;
generate, based on the financial transaction data and the authorization question, a correct answer to the authorization question;
provide the authorization question to a user;
receive a response to the authorization question;
determine, based on comparing a first timestamp associated with the authorization question and a second timestamp associated with a login access to the financial account, whether the login access to the financial account is detected after providing the authorization question to the user; and:
if the login access to the financial account is detected after providing the authorization question to the user, deny the request for authorization to perform the action relating to the financial account based on the response to the authorization question; or
if the login access to the financial account is not detected after providing the authorization question to the user, determine whether to grant the request for authorization to perform the action relating to the financial account based on the response to the authorization question.

* * * * *